US009288076B2

(12) United States Patent
Klug et al.

(10) Patent No.: US 9,288,076 B2
(45) Date of Patent: Mar. 15, 2016

(54) UPDATING OF PRESENCE DATA ALLOCATED TO THE USER OF A COMMUNICATION SERVICE

(75) Inventors: Karl Klug, Miesbach (DE); Thomas Lederer, Herrsching (DE); Harald Müller, Gilching (DE)

(73) Assignee: Unify GmbH & Co. KG, Munich (DE)

( * ) Notice: Subject to any disclaimer, the term of this patent is extended or adjusted under 35 U.S.C. 154(b) by 1044 days.

(21) Appl. No.: 10/570,008

(22) PCT Filed: Aug. 23, 2004

(86) PCT No.: PCT/EP2004/051876
§ 371 (c)(1),
(2), (4) Date: Feb. 28, 2006

(87) PCT Pub. No.: WO2005/025156
PCT Pub. Date: Mar. 17, 2005

(65) Prior Publication Data
US 2007/0002824 A1    Jan. 4, 2007

(30) Foreign Application Priority Data
Aug. 29, 2003   (DE) .................................. 103 40 386

(51) Int. Cl.
*G06F 15/16*    (2006.01)
*H04M 3/42*    (2006.01)
(Continued)

(52) U.S. Cl.
CPC .............. *H04L 12/581* (2013.01); *H04L 51/04* (2013.01); *H04L 67/24* (2013.01)

(58) Field of Classification Search
CPC ....... H04L 67/24; H04L 67/18; H04L 51/043; H04L 12/5815; H04L 67/28; H04M 3/42365; H04W 4/02; H04W 88/182
USPC ........................................................ 709/203
See application file for complete search history.

(56) References Cited

U.S. PATENT DOCUMENTS

2002/0097856 A1 *  7/2002  Wullert, II ............... 379/201.01
2003/0065788 A1    4/2003  Salomaki
(Continued)

FOREIGN PATENT DOCUMENTS

WO   WO 02/43351 A2   5/2002
WO   WO 02/093959 A1  11/2002
(Continued)

OTHER PUBLICATIONS

M. Day, J. Rosenberg, H. Sugano; "A Model for Presence and Instant Messaging"; Feb. 2000; pp. 1-14; Network Working Group; Request for Comments: 2778; Category: Informational; XP015008561.
(Continued)

*Primary Examiner* — Phuoc Nguyen
*Assistant Examiner* — Kishin G Belani
(74) *Attorney, Agent, or Firm* — Buchanan Ingersoll & Rooney PC

(57) ABSTRACT

Data characterizing the presence state of a user registered to use a communication service is sent to a server for the management of presence data in order to update presence data allocated to the user of a communication service. The data sent to the server is stored as presence data allocated to the user and is made available for predefinable other users. Authorization to change presence data is given to another selected user upon user release.

17 Claims, 2 Drawing Sheets

(51) Int. Cl.
  *G06F 3/048* (2013.01)
  *H04L 12/58* (2006.01)
  *H04L 29/08* (2006.01)

(56) References Cited

U.S. PATENT DOCUMENTS

| | | | |
|---|---|---|---|
| 2003/0083046 A1* | 5/2003 | Mathis | 455/412 |
| 2003/0110228 A1* | 6/2003 | Xu et al. | 709/207 |
| 2003/0217171 A1 | 11/2003 | Von Stuermer et al. | |
| 2004/0041849 A1* | 3/2004 | Mock et al. | 345/867 |
| 2004/0133641 A1* | 7/2004 | McKinnon et al. | 709/204 |
| 2004/0180646 A1* | 9/2004 | Donley et al. | 455/411 |
| 2004/0205175 A1* | 10/2004 | Kammerer | 709/223 |
| 2005/0047582 A1* | 3/2005 | Shaffer et al. | 379/265.11 |
| 2006/0190591 A1* | 8/2006 | Bobde et al. | 709/224 |
| 2007/0271384 A1* | 11/2007 | Zmudzinski et al. | 709/227 |

FOREIGN PATENT DOCUMENTS

| | | |
|---|---|---|
| WO | WO 03/044656 A1 | 5/2003 |
| WO | WO 03/069364 A2 | 8/2003 |

OTHER PUBLICATIONS

M. Day, S. Aggarwal, G. Mohr, J. Vincent; "Instant Messaging / Presence Protocol Requirements"; Feb. 2000; pp. 1-21; Network Working Group; Request for Comments: 2779; Category: Informational; XP015008562.

* cited by examiner

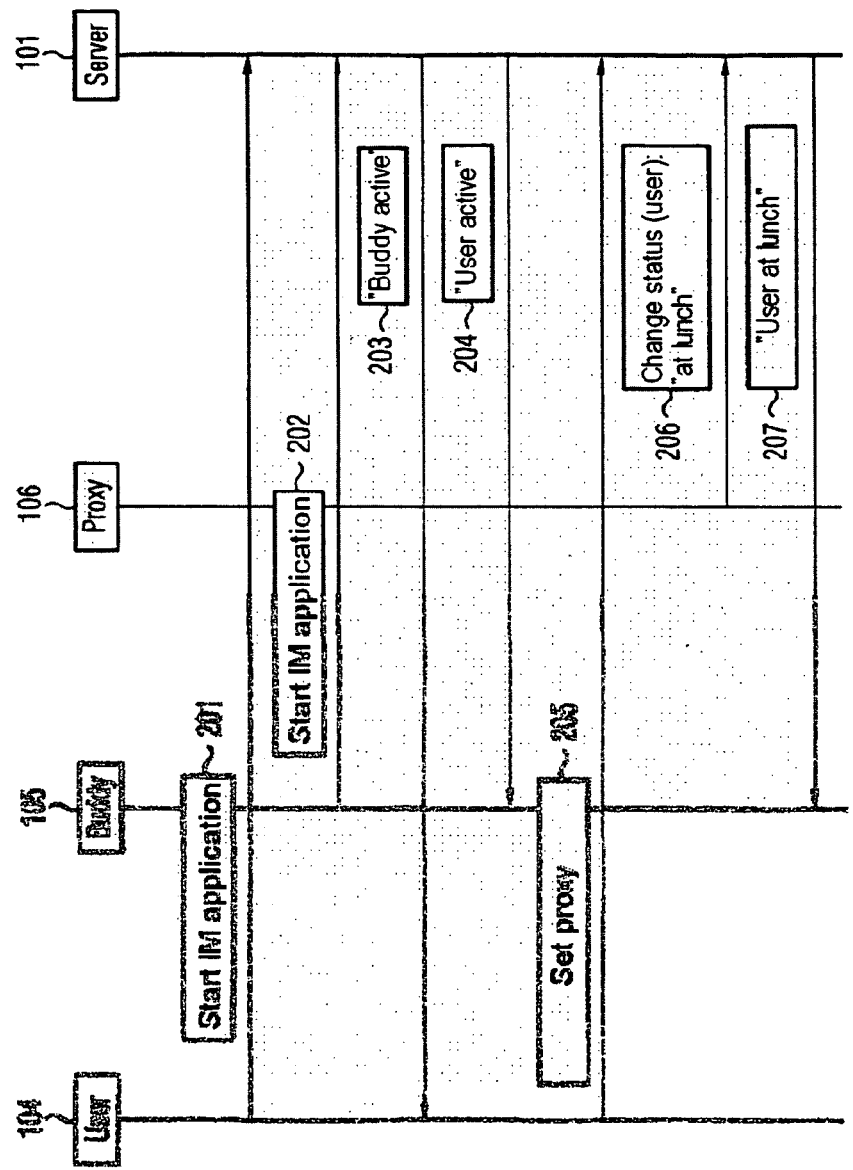

UPDATING OF PRESENCE DATA ALLOCATED TO THE USER OF A COMMUNICATION SERVICE

CROSS REFERENCE TO RELATED APPLICATIONS

This application is the US National Stage of International Application No. PCT/EP2004/051876, filed Aug. 23, 2004 and claims the benefit thereof. The International Application claims the benefits of German application No. 10340386.8 DE filed Aug. 29, 2003, both of the applications are incorporated by reference herein in their entirety.

FIELD OF INVENTION

The present invention relates to a method for updating presence information assigned to a user of a communication service, to a communication system and to a control program.

BACKGROUND OF INVENTION

Internet-based instant messaging applications for exchanging information within selected user groups without the familiar time delays of conventional e-mail applications are growing increasingly popular. Typical instant messaging applications enable a user to prepare a message to members of a selected user group, also referred to as a "buddy list", and to send the message for essentially immediate receipt. Messages sent by members of the selected user group in the opposite direction are received by the user analogously.

WO 02/43351 discloses a communication system in which a first server is provided to make available program applications and to exchange data with a first client, and a second server is provided to receive and to manage presence information assigned to the first client. Presence information indicates whether a user is currently obtainable at a specified terminal in the communication system. The first server is also provided in order to exchange data with a second client on the basis of the presence information assigned to the first client.

The presence information in the communication system described in WO 02/43351 can additionally be linked with a program application. If, for example, a user accesses a program application via a terminal, the program application assigns the presence information "active" to the user and monitors the activity of the user at the terminal. If no user activity is detected for a certain period of time, the program application triggers the sending of a check message to the terminal. If the user confirms the check message at the terminal, the presence information "active" continues to be assigned to the user. If the user fails to confirm the check message at the terminal, the presence information "inactive" or a similar appropriate value is assigned to the user. The presence information assigned to the user can also influence the delivery of messages from other users. Such a message is only delivered, for example, if the presence information "active" is actually assigned to the user at the time. If the presence information "active" is not assigned to the user at the time, the message is either deleted or forwarded to a different destination identified by the presence information.

It is a fundamental principle of instant messaging systems that the potential addressee of a message be obtainable. Delays in the sending and answering of messages are usual in e-mail systems, but it is generally undesirable in instant messaging systems to send a message to an addressee who will only receive the message hours or days later. Precautionary measures to determine exact presence information assigned to users in a communication system are consequently very important.

SUMMARY OF INVENTION

An object of the present invention is accordingly to specify an efficient method for updating presence information assigned to a user of a communication service and suitable means for implementing the method.

This object is achieved according to the invention by a method, a communication system and a control program having the features disclosed in the claims. Advantageous developments of the present invention are disclosed in the dependent claims.

One important aspect of the present invention is that a selected other user is granted permission to change presence information subject to authorization by a user registered to use a communication service. The presence information identifies a presence status of the user and is sent to a server for managing presence information, where it is stored and made available to definable other users. The introduction of a proxy-like permission to change presence information relating to a user yields benefits in terms of the fast and precise acquisition and provision of the presence information, which is no longer necessarily exclusively the task of the user.

According to an advantageous embodiment of the present invention, the communication service is an instant messaging service. This enables real-time communication or communication in near real time.

The presence information is advantageously made available so that it can be retrieved by the definable other users or sent to the definable other users by means of a multicast message. This enables efficient sending or distribution of the presence information.

According to a further advantageous embodiment of the present invention, the permission to change the presence information is granted by means of a message sent by the user to the server in which the selected other user is identified. This makes it possible to implement the granting of a permission with minimal overhead.

BRIEF DESCRIPTION OF THE DRAWINGS

The present invention is explained in more detail below with reference to an exemplary embodiment and to the drawing, in which:

FIG. 2 presents a diagram showing the exchange of messages between the clients and the server when an instant messaging application starts and when presence information is changed.

DETAILED DESCRIPTION OF INVENTION

Figure 1:
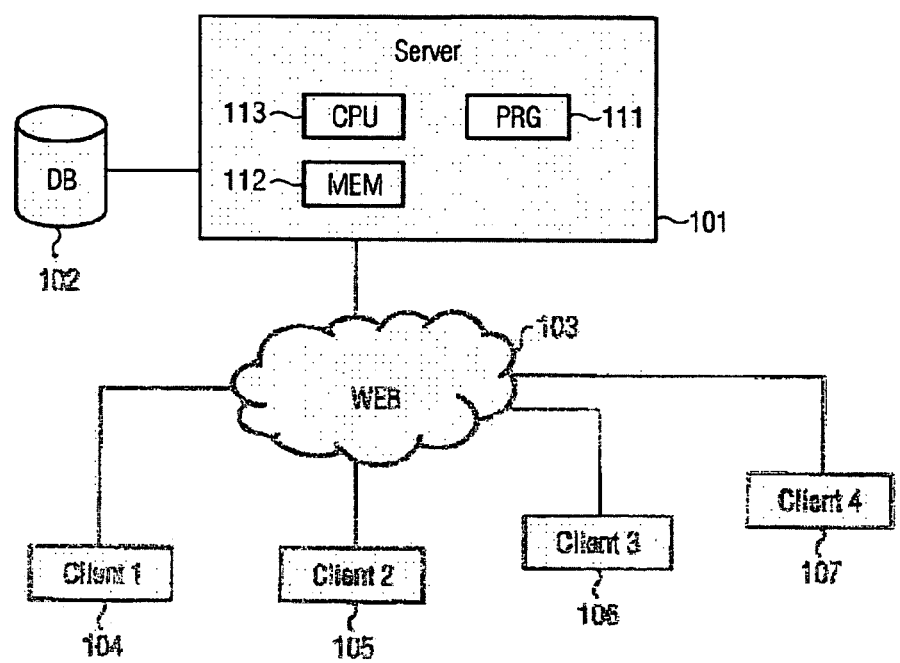
FIG. 1 shows an application environment for the present invention in which a server provides an instant messaging service and manages presence information and in which a plurality of clients use the instant messaging service.

The application environment shown in FIG. 1 includes a server 101 by means of which an instant message service is provided for use at multiple clients 104 to 107. The clients 104 to 107 are connected to the server 101 by a data network 103, for example the internet. Real-time communication connections between clients, at each of which a user has started an instant messaging application, are set up by the instant messaging service via the server 101. The server 101 is responsible here in particular for controlling and monitoring the communication connections between the clients 104 to 107. This also includes, by way of example, the monitoring of the bandwidth and quality of service necessary for provision of the instant messaging service.

As well as providing the instant messaging service, the server 101 has the task of managing presence information relating to users of the instant messaging service. Such presence information is advantageously acquired by the server 101 in response to a request from a user for provision of an instant messaging application when an instant messaging application is started at one of the clients 104 to 107. A database 102 assigned to the server 101 is provided to store the presence information. The server 101 is also responsible for sending presence information for a user currently using an instant messaging service to definable other users. The definable other users may for example be members of a configured user group such as a "buddy list".

Presence information can be sent to the definable other users by means of a multicast message, for example. Alternatively, it is possible to make the presence information available for retrieval by the definable other users in such a way that only the definable other users have permission to query the presence information. The server 101 is also provided to grant a permission to a selected other user, for example a proxy, to change the presence information assigned to a user. This permission is only granted if the user to whom the presence information relates has authorized such a procedure.

Installed on the server 101 to carry out the tasks described is a control program 111 that can be loaded into a working memory 112 of the server 101 and whose code sections can be executed by a processor 113 of the server 101. Execution of the control program 111 triggers the sending of information that identifies a presence status of a user registered to use the instant messaging service to the server 101 for managing presence information. When the control program 111 is executed, moreover, the information sent to the server 101 is stored as presence information assigned to the user and is made available to definable other users. Furthermore, a permission to change the presence information is granted to a selected other user subject to user authorization. These steps are carried out when the control program 111 runs on the server 101.

The diagram presented in FIG. 2 shows an exchange of messages between the clients 104 to 107 and the server 101 when an instant messaging application starts and when presence information is changed. When a user at a first client 104 starts an instant messaging application, a message 201 containing a request for the starting of an instant messaging application is sent to the server 101. The server 101 verifies the user's authority to start an instant messaging application and retrieves a user profile. The user profile specifies a configured user group, for example, the members of which have assigned each other a reciprocal permission to make presence information available to other members of the user group.

It is assumed in the following description that the user at the first client 104 is the first user in the user group to start an instant messaging application and is consequently the first user to be assigned the presence information "active". Being the first user, the user at the first client 104 is initially not informed about the presence statuses of other users in the user group. This does not happen until another member of the user group starts an instant messaging application at a second client 105.

When the instant messaging application is started at the second client, here too a message 202 containing a request for the starting of an instant messaging application is initially sent to the server 101 and then verified and processed by the server 101. If the outcome of the verification of the request by the server 101 is positive, the instant messaging application is provided at the second client 105. The user at the first client 104 is moreover informed of the new presence status of the other member of the user group by means of a message 203. The other member of the user group at the second client 105 is also informed analogously of the presence status of the user by means of a message 204.

If the user at the first client 104 wishes, for example, to delegate the updating of his or her presence status to a proxy at a third client 106, the user at the first client 104 sends a message 205 containing a request for the setting of a proxy to the server 101 This message 205 identifies the proxy at the third client 106 as a user permitted to change the presence information assigned to the user at the first client 104. The server 101 responds to this user authorization by granting the proxy at the third client 106 the requested permission. If, for example, the presence status of the user at the first client 104 then changes but the said user does not cause the presence information assigned to him or her to be updated, the proxy at the third client 106 can cause this to happen by means of a message 206 containing a request for the presence information assigned to the user of the first client 104 to be changed. If the necessary permission has been granted, the server 101 responds by changing the presence status of the user at the first client 104 and sends a message 207 about a change in the presence status of the user at the first client 104 to the additional member of the user group at the second client 105. A typical exemplary application is the updating of presence information for a user during a lunch break by a team assistant assigned to the user.

The application of the present invention is not limited to the exemplary embodiment described here.

The invention claimed is:

1. A method for updating presence information assigned to a first user of a substantially realtime instant messaging communications service, comprising:

a terminal sending information to a server identifying a presence status of the first user registered to use the instant messaging communications service, the server having non-transitory memory that has a control program stored thereon that is processed by the server;

the server storing the sent information identifying the presence status of the first user in non-transitory computer readable medium;

the server providing information identifying the presence status of the first user stored in the non-transitory computer readable medium to a terminal of a defined user of a buddy list of defined users assigned to the first user, the defined users defined by the first user;

the server monitoring communication connections for the service between the first user and defined users defined by the first user, the monitoring of the communication connections comprising monitoring of bandwidth and quality of service for the communication connections;

a terminal of the first user sending proxy information to the server authorizing a third user as a proxy on behalf of the first user in connection with presence status information of the first user;

the server changing the presence status of the first user stored in the non-transitory computer readable medium based on information received from a terminal of the proxy identifying a change in the presence status information of the first user after the third user was authorized as the proxy on behalf of the first user; and the server sending a message to the terminal of the defined user that identifies the changed presence status of the first user made based on the information the server received from the terminal of the proxy.

2. The method according to claim 1 wherein the service is an instant messaging service in which messages are exchanged between users of the service.

3. The method according to claim 1 wherein the presence information is retrieved by a terminal of the defined user, or wherein the presence information is sent to a terminal of the defined user via a message.

4. The method according to claim 2 wherein the message is a multicast message and wherein each terminal is a client of a communication system, the clients being electronic devices connected to the server via a data network.

5. The method according to claim 1 wherein the permission to change the presence information is granted via a message sent by the terminal of the first user to the server, the message identifying the authorized third user.

6. The method of claim 1 comprising:
controlling, by the server, the communication connections.

7. The method of claim 1 wherein the method also comprises:
the server responding to a query from a terminal of one of the defined users to provide information identifying a current presence status of the first user in response to the query.

8. A communication system, comprising:
a substantially realtime instant message communication service;
a server for managing presence information relating to a first user of the service; and
a presence information of the first user stored in non-transitory memory that is accessible to the server that is provided to a plurality of defined users of a list of defined users in a buddy list assigned to the first user via the server, the defined users defined by the first user;
wherein the server is configured to monitor communication connections between the first user and defined users defined by the first user by monitoring bandwidth and quality of service for the communication connections;
wherein the server is configured to receive proxy information from a terminal of the first user to authorize a third user as a proxy on behalf of the first user in connection with the presence information of the first user and is configured to receive information from the terminal of the proxy to update presence information of the first user after the third user is authorized as the proxy for the first user, and
wherein the server is configured to update the presence information of the first user based on presence status change information received from the terminal of the proxy of the first user and communicate a change in presence status of the first user made based on the presence status change information received from the proxy to terminals of the defined users.

9. The communication system according to claim 8 wherein the presence information updated by the proxy of the first user is sent to the defined user via at least one message sent to at least one of the plurality of defined users.

10. The communication system according to claim 9 wherein the at least one message is a multicast message.

11. The communication system according to claim 9 wherein the authorization of the third user is provided via a message from the first user.

12. The communication system according to claim 8 wherein the service is an instant messaging service in which messages are exchanged between users of the service and the terminals are devices communicatively connectable to the server for use of the service.

13. The system of claim 8 wherein the server is configured to control the communication connections.

14. The system of claim 13 wherein the server is also configured to respond to a query from a terminal of one of the defined users to provide information identifying a current presence status of the first user in response to the query.

15. A non-transitory computer readable medium having a computer program stored thereon such that the computer program is processable by a computing device to execute a method defined by the computer program, the method comprising:
receiving information identifying a presence status of the first user registered to use an instant message communication service;
storing the received information;
providing the information to a defined user of a list of defined users defined by the first user in a buddy list assigned to the first user;
monitoring communication connections between the first user and defined users defined by the first user, wherein the monitoring of the communication connections comprises monitoring of bandwidth and quality of service for the communication connections;
receiving proxy information by the first user authorizing a third user as a proxy on behalf of the first user in connection with the presence information of the first user;
updating of the presence information of the first user based on information received from the proxy after the third user is authorized as the proxy and communicating a change in presence status of the first user based on the updated presence information to the defined user.

16. The non-transitory computer readable medium of claim 15 wherein the service is an instant messaging service in which messages are exchangeable between users of the service and wherein the method further comprises:
controlling the communication connections.

17. The non-transitory computer readable medium of claim 16 wherein the method also comprises:
responding to a query from a terminal of one of the defined users to provide information identifying a current presence status of the first user in response to the query.

* * * * *